United States Patent [19]
Sandel et al.

[11] Patent Number: 5,270,604
[45] Date of Patent: Dec. 14, 1993

[54] TANDEM FIELD ALTERNATOR HAVING AN IMPROVED COIL AND SLIP RING CONNECTION AND METHOD OF MAKING THE SAME

[75] Inventors: Robert J. Sandel; Arthur J. Gajewski, both of Canton; James E. Caldwell, Allen Park, all of Mich.

[73] Assignee: Ford Motor Company, Dearborn, Mich.

[21] Appl. No.: 886,587

[22] Filed: May 21, 1992

[51] Int. Cl.$^5$ .............................................. H02K 1/00
[52] U.S. Cl. ..................................... 310/263; 310/194; 310/198
[58] Field of Search ................... 310/45, 71, 194, 193, 310/198, 263, 232

[56] References Cited

U.S. PATENT DOCUMENTS

| | | | |
|---|---|---|---|
| 829,015 | 8/1906 | Johnson | 310/263 |
| 2,795,715 | 6/1957 | Gilchrist | 310/263 |
| 4,087,736 | 5/1978 | Mori et al. | 310/263 |
| 4,105,907 | 8/1978 | Hagenlocher et al. | 310/232 |
| 4,228,377 | 10/1980 | Kreuzer | 310/263 |
| 4,307,314 | 12/1981 | Yamada et al. | 310/263 |
| 4,618,793 | 10/1986 | Shizuka et al. | 310/232 |
| 4,980,595 | 12/1990 | Arora | 310/263 |

FOREIGN PATENT DOCUMENTS 959540  6/1964  United Kingdom .

Primary Examiner—Steven L. Stephan
Assistant Examiner—Thomas M. Dougherty
Attorney, Agent, or Firm—Paul K. Godwin; Roger L. May

[57] ABSTRACT

A tandem Coil armature in which a pair of spaced-apart field coils [91,92] are wound on bobbins [12,14] mounted within a set of magnetic core pieces [16,18,20,22]. Two L-shaped conductors [27,28] pass through passageways through the core pieces and connect the windings to slip-rings [72,74]. Insulated conductor carriers [31,32,37,38] sized to mate with passageways and recesses in the core pieces support the L-shaped conductors and electrically insulate them from the magnetic core piece material. The core pieces are mounted for rotation with the rotor shaft [10] and include interleaved claws at their periphery which form the rotors magnetic poles.

6 Claims, 4 Drawing Sheets

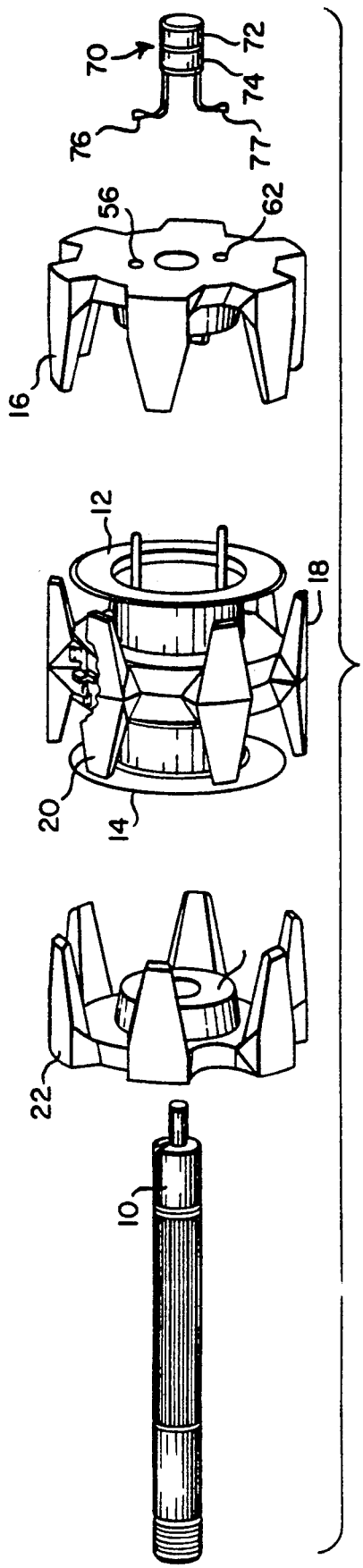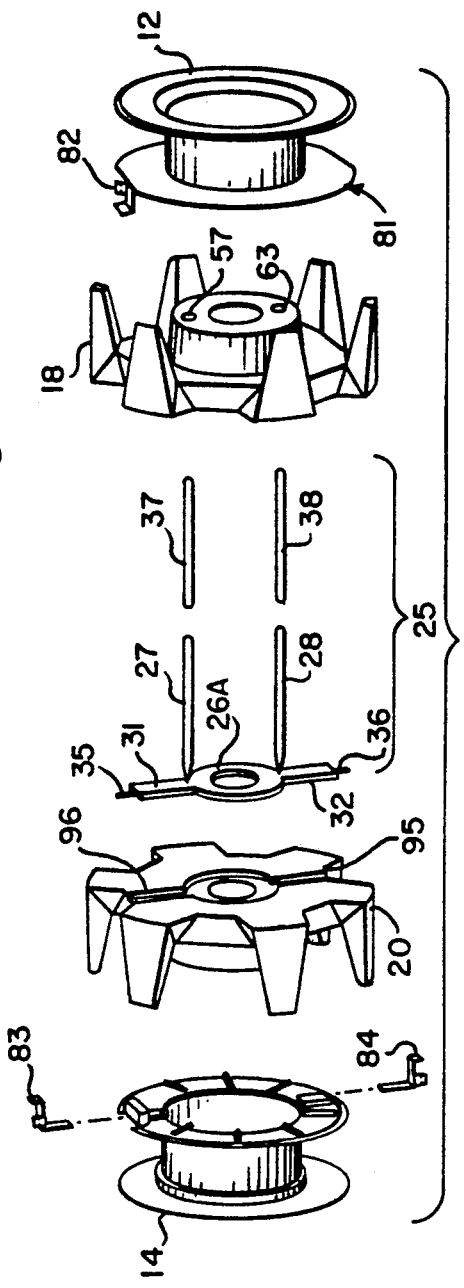

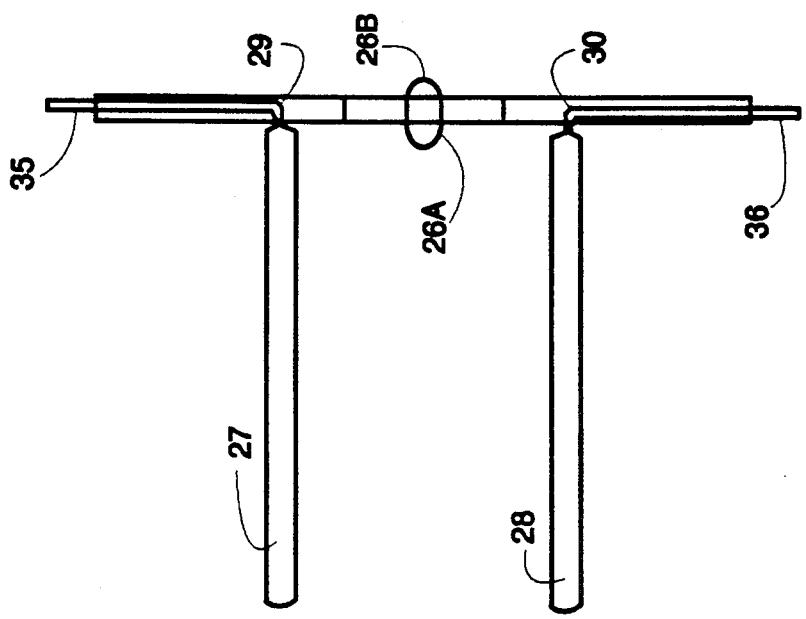
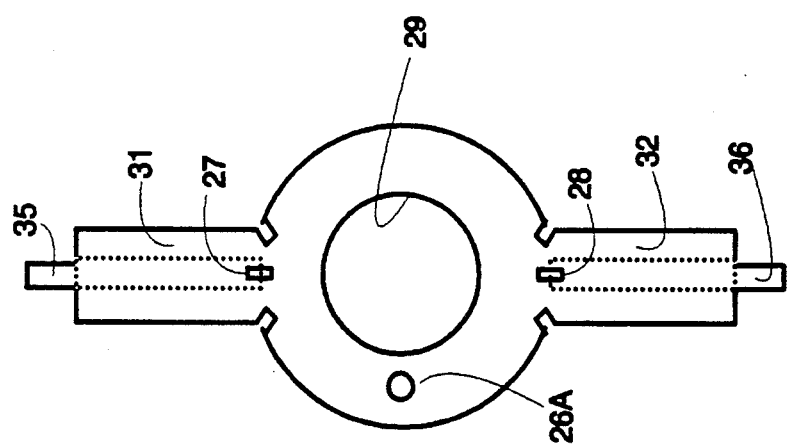
Fig. 7B
Fig. 7A

TANDEM FIELD ALTERNATOR HAVING AN IMPROVED COIL AND SLIP RING CONNECTION AND METHOD OF MAKING THE SAME

FIELD OF THE INVENTION

This invention relates generally to rotating electrical energy converters and more particularly, although in its broader aspects not exclusively, to a rotor for a tandem coil alternator which incorporates an improved arrangement for reliably and inexpensively interconnecting the rotor's field coils and slip-rings.

BACKGROUND AND SUMMARY OF THE INVENTION

Tandem coil alternators have desirable properties for general automotive use and typically employ a rotor comprising an assembly of magnetically-permeable core pieces which surround and support two separate field coils. The two field coils are energized through slip rings positioned on the rotor shaft external to the core pieces. Alternators and generators using tandem field rotors generate more electrical energy at lower rotational speeds than conventional rotors of comparable size and weight, and offer a more desirable package shape for many applications since they have a smaller diameter relative to their length. The magnetic flux path for each field coil in a tandem field motor may be advantageously provided by a pair of core pieces having interleaved claws which surround the coil. An early tandem-field rotor of this type is described in U.S. Pat. No. 829,015 and a more recent design is described in U.S. Pat. No. 4,980,595.

A tandem field rotor must incorporate electrical interconnections between the slip rings and the field coils. It is an object of this invention to improve the reliability of such interconnections by making them a mechanically integral part of the rotor structure. It is a further object of the invention to obtain such a durable structure using fabrication methods which minimize labor and materials costs.

In a principal aspect, the present invention takes the form of an improved arrangement for interconnecting the windings and slip rings in the rotor of an alternator or the like. In accordance with the invention, sized passageways formed in the magnetic core pieces surround and rigidly support a pair of L-shaped electrical conductors which connect the coils to the two slip rings.

Insulating sleeves sized to conform to the core passageways separate the L-shaped conductors from the magnetic core structure. These sleeves include a pair of axially-extending tubes which support and surround the axial arm of each L-shaped conductor as that arm passes through the body of the magnetic cage structure. The radial arms of the two L-shaped conductors are embedded in a radial support member which is provided with a center hole through which the rotor shaft passes and which is shaped to conform to a retaining channel formed by recesses in the abutting faces of the interior core pieces.

According to a further feature of the invention, each field coil is wound on an insulating support bobbin. A pair of electrical contact terminals are attached to the bobbin and positioned to engage with and form an electrical connection to an exposed contact surface formed by the end of the radially-extending arm of each L-shaped conductor. Correspondingly, the end of the axially-extending arm of each L-shaped conductor extends beyond the end of the tube which insulates it from the core pieces to form further exposed contact surfaces to which the slip ring terminals may be readily connected during fabrication.

BRIEF DESCRIPTION OF THE DRAWINGS

FIG. 1 is a partially exploded perspective view of components included in an alternator rotor of the invention;

FIG. 2 is an exploded view of the components of the rotor which are seen, in assembled form, within the partial circle 2—2 in FIG. 1;

FIGS. 7A and 7B are side and end plan views respectively of the conductor carrier.

DESCRIPTION OF THE PREFERRED EMBODIMENT

Figure 4:
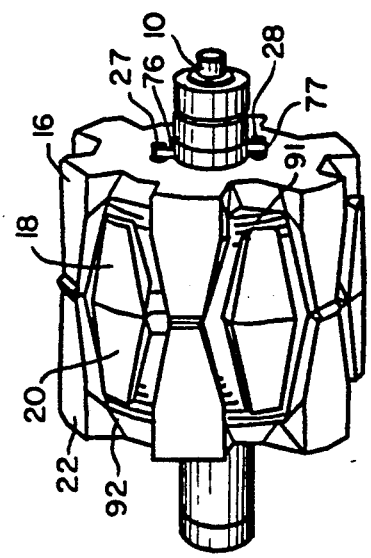
FIG. 4 is a perspective view of the assembled rotor.

As seen in FIGS. 1 and 2, all of the major components of the rotor are mounted on the rotor shaft 10 which is knurled and keyed such that all rotor components are held in fixed position and rotate with the shaft 10 about a single axis of rotation.

The rotor's field windings (not shown in FIGS. 1 and 2) are wound on insulating bobbins 12 and 14 formed from nylon or other suitable material. The bobbin 12 is surrounded by a claw-type pole piece formed by two core pieces 16 and 18, while the bobbin 14 is enclosed within a pole piece formed by the core pieces 20 and 22. Each of the core pieces 16, 18, 20 and 22 comprises an inner annular section such as the section 24 of core 22 seen in FIG. 1. These annular sections surround an axial bore which receives the shaft 10 and have an outside diameter slightly smaller that the inside diameter of the bobbin 14, thus supporting and axially aligning the bobbin with respect to the shaft.

The core pieces 18 and 20 have abutting interior mating surfaces which are recessed to form channels, channel 95 and 96 in section 20 being shown in FIG. 1. These channels receive the radially extending portion of a conductor carrier indicated generally at 25 in FIG. 2, and shown in more detail in FIGS. 7A and 7B of the drawings. The conductor carrier 25 supports and insulates two L-shaped conductors 27 and 28 formed from conductive straps or bars having a rectangular cross-section. The strap material is both bent and twisted by 90 degrees at the elbow 29 and 30 of L-shaped conductors 27 and 28 respectively as seen in FIG. 7B. The radially extending portions of conductors 27 and 28 are embedded in and form an integral part of the radial flange sections 31 and 32 respectively of the conductor carrier 25. Both conductors extend outwardly beyond carrier 25 to form contact tabs at 35 and 36. Insulated hollow tubes 37 and 38 act as sleeves for the axially extending arms of the conductors 27 and 28 respectively as those conductors pass through axial passageways through the pole piece formed by core pieces 16 and 18. Conductor 27 and sleeve 37 pass through the axial holes 56 and 57 in core pieces 16 and 18 respectively, while conductor 28 and sleeve 38 pass through holes 62 and 63 in core pieces 16 and 18 respectively. As seen in the cross-sectional view of FIG. 5, both of the L-shaped conductors are securely retained in and protected by the core pieces through which they pass, and are maintained in insulated, spaced relation from the core pieces by the carrier 25.

The body of the radial portion of the conductor carrier 25 is formed from an rigid insulating material such as nylon. A central hole seen at 29 in FIG. 7A is sized to receive the rotor shaft 10. The flange sections 31 and 32, in which the conductors 27 and 28 respectively are embedded, extend outwardly from the central circular section of carrier 25 that surrounds hole 29. The radial flange sections 31 and 32 of the conductor carrier 25 fits within like recesses in the abutting faces of core pieces 18 and 20. The recesses 95 and 96 in core piece 20 are clearly seen at 95 in FIG. 1. Each recess further includes a hole for receiving one of the alignment pegs 26A or 26B (see FIG. 7B), the recess 96 for receiving alignment peg 26B being seen in FIG. 1.

Figure 5:
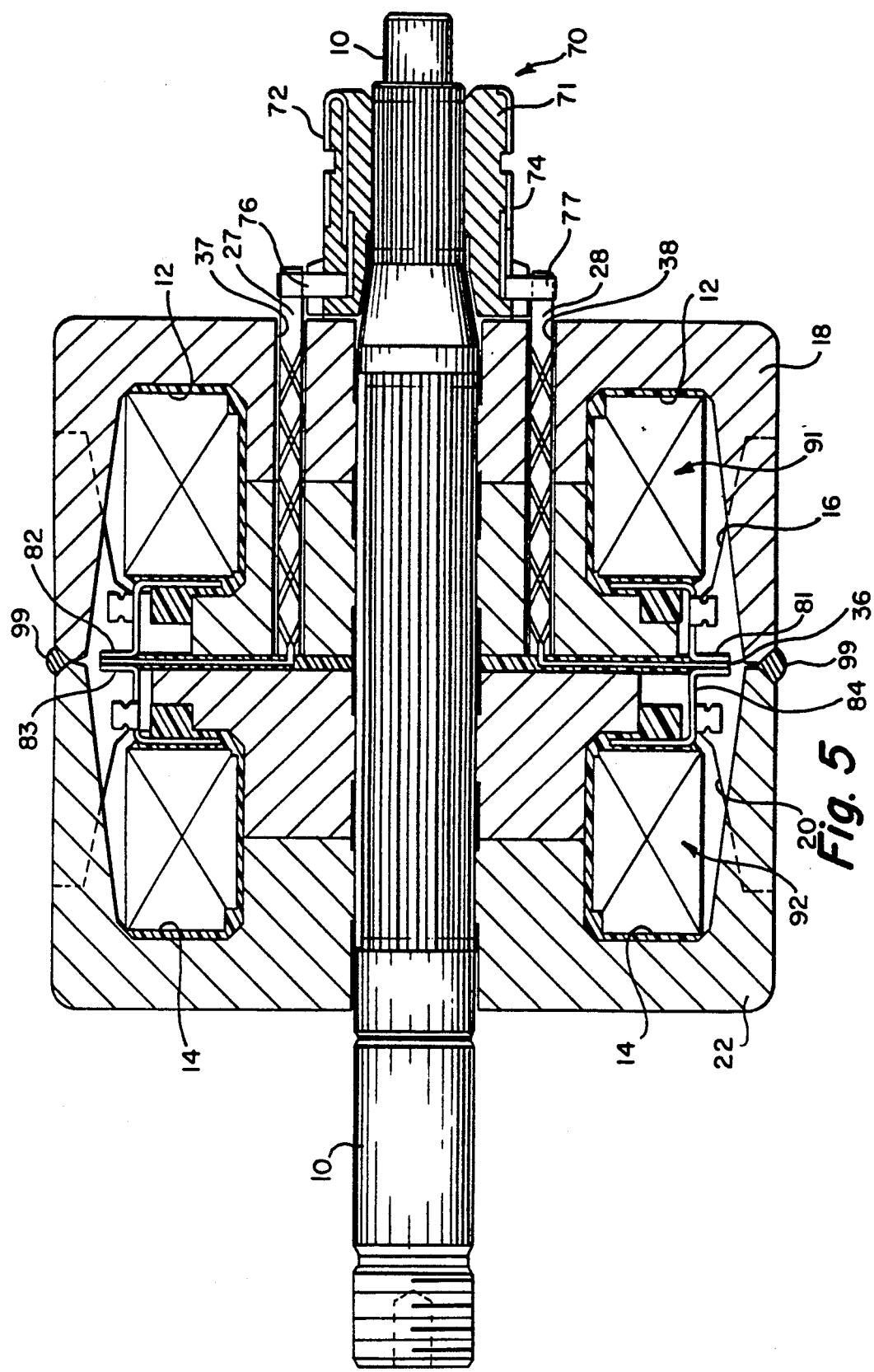
FIG. 5 is a cross-sectional view of the rotor.

A slip ring assembly seen generally at 70 in FIG. 1, and seen in cross-section in FIG. 5, includes a cylindrical insulating support 71 for a pair of conductive slip rings 72 and 74. Each of the slip rings is electrically connected to a terminal tab which extends radially outward from the insulating support 71 as seen in detail in the cross-sectional view of FIG. 5. The outer slip ring 72 connects to the radially extending tab 76 while the inner slip ring 74 connects to the tab 77. Tabs 76 and 77 are positioned to contact the axially extending ends of the L-shaped conductors 27 and 28 respectively after finally assembly. As noted earlier, the tabs 35 and 36 at the radially extending ends of conductors 27 and 28 form contact surfaces positioned to make contact with contact terminals 81–84 which are physically attached to the bobbins 12 and 14 and electrically connected to the windings 91 and 92.

When assembled, the rotor seen in the exploded view of FIG. 1 has the external appearance illustrated in FIG. 4, in which the windings 91 and 92 can be seen within the pole piece formed by core pieces 16,18,20 and 22. FIG. 4 also shows how the axially extending claws of two outer core pieces 16 and 22 engage to form a first array of peripheral magnetic poles, and how the two inner core pieces 18 and 20 engage to form a second set of magnetic poles interleaved with the first set.

Figure 6:
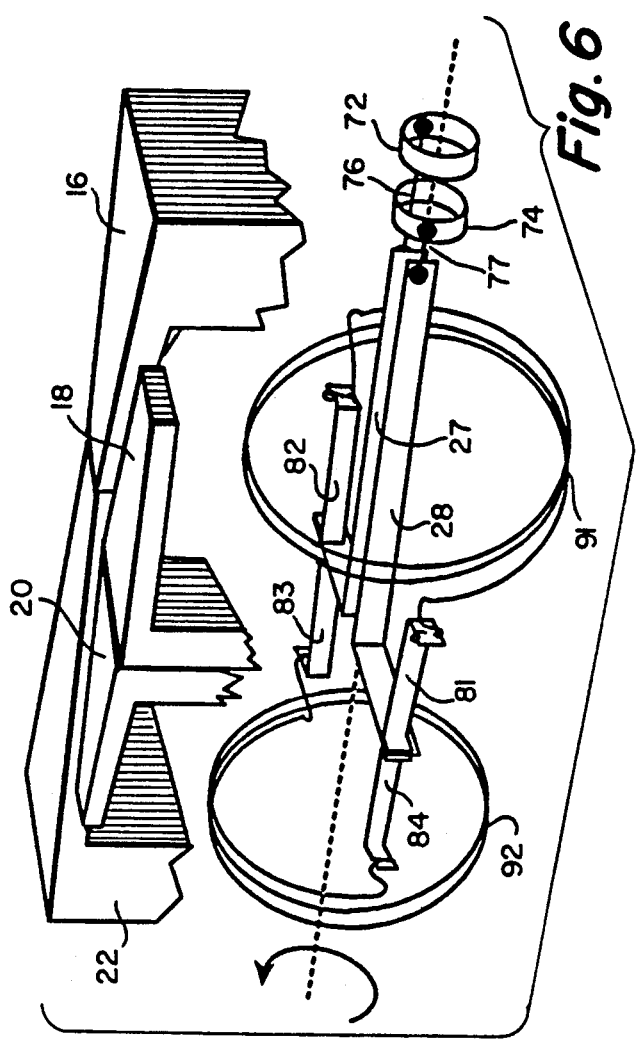
FIG. 6 is a schematic representation of the electrical connections within the rotor.

In order to create the desired magnetic field between opposing poles at the peripheral surface of the rotor, the coils 91 and 92 need to be energized by currents flowing in opposite circular directions about the shaft 10. The connections needed to establish these opposite current flows are illustrated in the schematic representation of FIG. 6. As there seen, energizing the slip rings 72 and 74 causes current to flow through a current path which may be traced from slip ring 72 through the L-shaped conductor 27 to both contact terminals 82 and 83. Current flows in parallel (and in opposite rotational directions) through the windings 91 and 92 to contact terminals 81 and 84, which are connected via the L-shaped conductor 28 to the slip ring 74. This current flow creates a magnetic field which causes a first magnetic pole to be induced in the peripheral claw portion of core pieces 18 and 20, and the opposing magnetic pole to be induced in the peripheral claw portion of core pieces 16 and 22 as depicted in FIG. 6.

ASSEMBLY METHOD

The rotor embodying the invention which has been described forms a mechanically robust and electrically reliable connection between the two field coils and the slip rings. The two L-shaped conductors 27 and 28 are routed through protected passageways in the core pieces which ensure the electrical and mechanical integrity of the interconnecting electrical pathways. In addition, as next discussed, the arrangement contemplated by the invention is advantageously adapted for ease of manufacture with a reduced number of easily assembled parts. The steps which comprise the method of manufacture may be easily understood by considering the exploded views provided by FIGS. 1 and 2.

Figure 3:
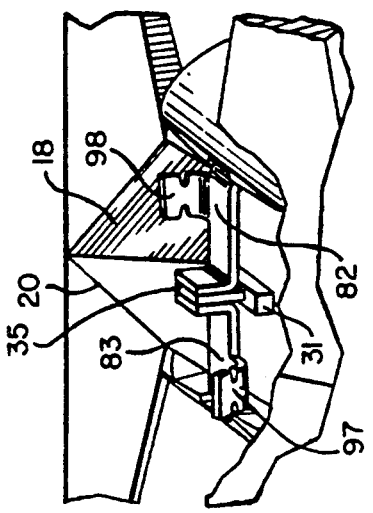
FIG. 3 is an enlargement of the area indicated by the partial circle 3—3 in FIG. 1.

The field coil subassemblies which may be advantageously fabricated in advance. The field coil subassemblies are formed by winding wire having high conductivity on the nylon bobbins 12 and 14, inserting the contact terminals 81–84 in the slots provided in the bobbins as shown in FIG. 2, and by wrapping and soldering the ends of winding conductors to the wire-wrap tabs (seen at 97 and 98 of FIG. 3). The field coils as thus fabricated are then ready to be combined with the remaining components during the final rotor assembly process next described.

The insulating sleeves 37 and 38 are placed over the extending arms of the L-shaped conductors 27 and 28 respectively, and these arms and sleeves are then inserted through the axial passageways 57 and 63 in the inner core piece 18 as seen in FIG. 2. Alternatively, insulating sleeves 37 and 38 may be an integral part of the conductors 27 and 28.

The components shown in FIG. 2 are next assembled in the form shown within the partial circle 2—2 of FIG. 1. A subassembly is thus formed which comprises, from left to right, the bobbin 14 (on which one of the field coil 92 is wound), the core piece 20, the core piece 18 into which the axial arms of L-shaped conductors 27 and 28 have inserted, and the bobbin 12 which carries the field coil 91. The welding of terminals 83, and 82 to tab 35, as well as the welding of terminals 84 and 81 to tab 36, is performed on the subassembly prior to the assembly on the shaft 92.

The subassembly seen in FIG. 2 is then combined on the shaft with the outer two core pieces 16 and 22, with the outer pole pieces 16 and 22 being welded together at weld points seen at 99 in FIGS. 4 and 5. When the slip ring assembly 70 is placed on the shaft 10, the ends of the axially extending arms of the L-shaped conductors 27 and 29 are positioned in mechanical contact with the contact tabs 76 and 77 of the slip rings at the externally accessible soldering points seen in FIGS. 4 and 5.

It is to be understood that numerous modifications may be made to the specific physical structures and methods of manufacture which have been described above without departing from the true spirit and scope of the invention.

What is claimed is:

1. A tandem-field automotive alternator rotor comprising, in combination, a rotor shaft, first and second rotor coils each wound on an insulated bobbin, first and second core pieces for surrounding and supporting the bobbin of said first and second coils respectively, said first and second core pieces being axially mounted on said shaft in engagement with one another at a mating surface the plane of which is perpendicular to the axis of said shaft, first and second slip rings mounted on said shaft for rotation therewith, said slip rings being positioned on said shaft external to said engaged first and second core pieces,
an insulated conductor carrier positioned between said engaged first and second core pieces at said mating surface, said carrier comprising, in combination,
a electrically insulating conductor support member provided with a center-opening for receiving said shaft and a pair of radial flange sections which extend outwardly on opposing sides of said center opening, said flange sections respectively providing a surrounding insulating support for a pair of radially-extending electrical conductors, each of said conductors extending beyond the outward end of its supporting flange member to form a contact surface, and
a pair of hollow insulating tubes each extending axially outward from one of said flange sections, said tubes surrounding and supporting an axially-extending conductor which is in electrical contact with the inner end of one of said radially-extending conductors,
a pair of spaced apart axial passageways through one of said engaged first and second core pieces for respectively receiving said pair of insulating tubes,
means for electrically connecting the outer end of each of said axially-extending conductors to one of said slip rings, and
a pair of resilient conductive contact members attached to and extending axially from each of said bobbins, each of said contact members being electrically connected to one end of a coil and being positioned to engage with the contact surface formed by the outward end of one of said radially-extending conductors.

2. A rotor as set forth in claim wherein a recess is formed in the outer surface of the disk member of at least one of said pole structures at said mating surface, said recess being shaped to receive and retain said insulated conductor carrier.

3. A rotor as set forth in claim 1 wherein each of said pole pieces comprises a pair of pole structures each axially mounted on said shaft and each consisting of a circular disk member having a center-hole for receiving said shaft and a plurality of claws extending axially from the outer edge of said disk member, said claws being sized to interleave in spaced-apart relationship with like claws extending from the other pole structure in each pole piece.

4. A rotor for a rotating energy converter comprising, in combination,
a rotor shaft,
a pair of field coils each wound on an insulated bobbin,
four axially arranged permeable core pieces, two of which surrounding each of said field coils, each of said core pieces being axially bored to receive said shaft and each including axially extending claws adapted to extend over one of said coils in a spaced and interleaved position with respect to the claws of another of said core pieces,
a pair of slip rings attached to said shaft by insulating support means at a point external to said core pieces,
a pair of L-shaped conductors each having one arm which extends axially and a second arm which extends radially with respect to said rotor shaft,
a radial passageway for receiving and retaining the radially extending arm of each of said conductors, said radial passageway being formed by a recess in at least one of the abutting surfaces of the two interior ones of said core pieces, said radial passageway supporting said radial arm such that its outer end extends to a point of electrical connection to one end of both of said field coils,
axial passageways through at least one of said core pieces for receiving and retaining the radially extending arm of each of said L-shaped conductors such that said radially extending arms extend to a point of electrical connection to said slip rings.

5. A rotor as set forth in claim 4 further comprising, in combination,
a pair of contact terminals attached to each of said bobbins, each of said contact terminals being shaped to present a first contact surface about which an end of one of said coils can be wrapped, and a second exposed contact surface, and
means for connecting said second exposed contact surface of each of said contact terminals to the outer end of the radially extending arm of one of said L-shaped conductors.

6. A tandem coil rotor assembly comprising in combination,
an armature shaft,
a pair of electrical slip rings positioned at one end of said shaft,
first and second electrical windings wound on first and second insulating bobbins respectively,
a first magnetic core assembly which supports and surrounds said first winding and said first bobbin,
a second magnetic core assembly which supports and surrounds said second winding and said second bobbin,
a conductor carrier having a central opening adapted to receive said armature shaft, said carrier defining first and second radial passageways,
said first and said second core assemblies being provided with central openings adapted to receive said armature shaft, said first and second assemblies being mounted on said shaft such that said conductor carrier is sandwiched between and retained by said assemblies,
a pair of L-shaped conductors each having a radial portion which extends outwardly through one of said radial passageways to an outer connection point and each having an axially extending portion which extends through a passageway through one of said core assemblies to connect to one of said slip rings, and
means for electrically connecting both of said windings to said outer connection point on each of said L-shaped conductors.

* * * * *